(12) United States Patent
Lannoije et al.

(10) Patent No.: US 10,300,803 B2
(45) Date of Patent: May 28, 2019

(54) METHOD OF OPERATING AN INDUCTIVE POWER TRANSFER SYSTEM AND AN INDUCTIVE POWER TRANSFER SYSTEM

(71) Applicant: Bombardier Primove GmbH, Berlin (DE)

(72) Inventors: Marnix Lannoije, Heidelberg (DE); Dominik Anders, Mannheim (DE); Robert Czainski, Doluje (PL); Jürgen Kett, Mannheim (DE); Martin Dechert, Heltersberg (DE); Christian Apelt, Mannheim (DE)

(73) Assignee: Bombardier Primove GmbH, Berlin (DE)

( * ) Notice: Subject to any disclaimer, the term of this patent is extended or adjusted under 35 U.S.C. 154(b) by 114 days.

(21) Appl. No.: 15/517,752

(22) PCT Filed: Oct. 8, 2015

(86) PCT No.: PCT/EP2015/073229
§ 371 (c)(1),
(2) Date: Apr. 7, 2017

(87) PCT Pub. No.: WO2016/055556
PCT Pub. Date: Apr. 14, 2016

(65) Prior Publication Data
US 2018/0208072 A1    Jul. 26, 2018

(30) Foreign Application Priority Data
Oct. 9, 2014  (GB) .................................. 1417892.5

(51) Int. Cl.
H01M 10/44 (2006.01)
H01M 10/46 (2006.01)
(Continued)

(52) U.S. Cl.
CPC ......... B60L 11/1829 (2013.01); B60L 11/185 (2013.01); B60L 11/1831 (2013.01);
(Continued)

(58) Field of Classification Search
USPC .................. 320/107, 108, 114, 115; 307/104
See application file for complete search history.

(56) References Cited

U.S. PATENT DOCUMENTS

| | | | |
|---|---|---|---|
| 5,598,327 A * | 1/1997 | Somerville | H01F 17/0006 336/200 |
| 5,654,621 A | 8/1997 | Seelig | |

(Continued)

FOREIGN PATENT DOCUMENTS

| | | |
|---|---|---|
| DE | 102007033654 A1 | 4/2008 |
| DE | 102010042395 A1 | 4/2012 |
| WO | 2014029823 A2 | 2/2014 |

Primary Examiner — Edward Tso
(74) Attorney, Agent, or Firm — The Webb Law Firm

(57) ABSTRACT

Disclosed is a system and a method of operating an inductive power transfer system for transferring power to a vehicle. The inductive power transfer system includes a primary winding structure for generating an alternating electromagnetic field and a secondary winding structure for receiving the alternating electromagnetic field and generating an alternating current output voltage, wherein the alternating current output voltage is rectified and supplied to at least one energy storage element. The rectified output voltage is adjusted by varying a gap size of a gap between the primary winding structure and the secondary winding structure, wherein the gap size is adjusted to prepare and/or to initiate and/or to control an energy transfer process depending on charging characteristics of the at least one energy storage element.

17 Claims, 6 Drawing Sheets

(51) Int. Cl.
*B60L 11/18* (2006.01)
*H02J 50/90* (2016.01)
*H02J 7/02* (2016.01)
*H02J 50/10* (2016.01)
*H02J 50/12* (2016.01)
*B60R 16/03* (2006.01)

(52) U.S. Cl.
CPC .......... *B60L 11/1833* (2013.01); *B60R 16/03* (2013.01); *H02J 7/025* (2013.01); *H02J 50/10* (2016.02); *H02J 50/12* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2010/0235006 A1 | 9/2010 | Brown |
| 2013/0038282 A1 | 2/2013 | Shimokawa |
| 2013/0154554 A1 | 6/2013 | Sakai et al. |
| 2014/0028250 A1 | 1/2014 | Nishino |
| 2014/0111152 A1 | 4/2014 | Kai et al. |
| 2015/0341085 A1* | 11/2015 | Ettes .................... H04B 5/0031 307/104 |
| 2017/0080815 A1 | 3/2017 | Wechsler et al. |

* cited by examiner

State of the art

State of the art

METHOD OF OPERATING AN INDUCTIVE POWER TRANSFER SYSTEM AND AN INDUCTIVE POWER TRANSFER SYSTEM

CROSS-REFERENCE TO RELATED APPLICATIONS

This application is the United States national phase of International Application No. PCT/EP2015/073229 filed Oct. 8, 2015, and claims priority to United Kingdom Patent Application No. 1417892.5 filed Oct. 9, 2014, the disclosures of which are hereby incorporated in their entirety by reference.

BACKGROUND OF THE INVENTION

Field of the Invention

A method of operating an inductive power transfer system and an inductive power transfer system Description of Related Art The invention relates to a method of operating an inductive power transfer system for transferring power to a vehicle and such an inductive power transfer system.

Vehicles, in particular electric vehicles, more particular track-bound vehicles, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of e.g. three-phase windings. A first set is installed on the ground (primary winding structure) and can be fed by a wayside power converter (WPC). The second set of windings (secondary winding structure) is installed on the vehicle. For example, the second set of windings can be attached underneath the vehicle, in the case of trams under some of its wagons. For an automobile, it can be attached to the vehicle chassis. The second set of windings or, generally, the secondary side is often referred to as pick-up-arrangement or receiving device. The first set of windings and the second set of windings form a high frequency transformer to transfer electric energy to the vehicle. This can be done in a static state (when there is no movement of the vehicle) and in a dynamic state (when the vehicle moves).

Known are inductive power transfer systems which comprise a movable primary element. U.S. Pat. No. 5,654,621 A discloses an inductive transmitter having a primary element and a secondary element which is attached to the vehicle, wherein the primary element is power driven to move in all three spatial coordinates with a predetermined spatial area.

DE 102010042395 A1 discloses a system for inductive charging of a battery of a vehicle, wherein a primary coil is automatically placeable.

DE 102007033654 A1 discloses a base unit with a driving means to reduce a distance between a primary conductor and a secondary coil.

US 2010/0235006 A1 discloses a movable automated charging apparatus comprising a base, a scissor lift, a pedestal, a joint and a charger. The charger is configured to mate with a vehicle receptacle physically or via proximity.

GB 1403547.1 (not yet published) discloses an inductive power transfer pad comprising a stationary part and a movable part, wherein the movable part comprises a primary winding structure, wherein the movable part is movable between a retracted state and an extended state.

PCT/EP2013/067414 discloses an inductive pick-up arrangement to be mounted on an electric vehicle which shall be operated with electric energy produced by the arrangement by magnetic induction, wherein:

the arrangement comprises a pick-up portion comprising at least one electric inductance for receiving a magnetic field and for producing the electric energy, the arrangement comprises a mounting portion to be mounted on the vehicle, the arrangement comprises one actuator or a set of at least two actuators for actuating movement of the pick-up portion relative to the mounting portion, the mounting portion and the pick-up portion are moveably connected to each other by at least one connecting portion, the actuator or the set of actuators can be actuated such that the pick-up portion is moved in a vertical direction, the actuator or the set of actuators can be actuated such that the pick-up portion is additionally or alternatively moved in a lateral direction.

Further disclosed is that a movement of the pick-up portion is controlled in dependence of an output voltage of an electric inductance mounted on the pick-up portion.

FIG. 1 shows a first layout of an inductive power transfer system 1 according to the state of the art. A wayside WS and a vehicle side VS are indicated. A direct current (DC) source provides a DC output voltage, typically in the range of 500 V to 900 V. The DC voltage source provides the output voltage to an input voltage generating means 3 which can generate an output voltage higher than its input voltage. The output voltage of the input voltage generating means 3 is provided to a wayside power converter (WPC) 4 which comprises an inverter 5 and an output filter 6.

The input voltage generating means 3 is shown in FIG. 2. It comprises a step-up converter 7, an intermediate circuit capacitor 8 and a step-down converter 9 connected in series. The step-up converter 7 generates a voltage which is higher than its input voltage, e.g. the output voltage of the DC voltage source 2 (see FIG. 1). The step-down converter 9 generates a variable DC output voltage which, in turn, can provide the input voltage of the WPC 4. Thus, the input voltage generating means 3 is provided by a two-stage voltage converter.

Returning to FIG. 1, the WPC 4 generates an input voltage for a high frequency transformer 10 which comprises the primary winding structure and the secondary winding structure (not shown). The secondary winding structure of the high frequency transformer 10 provides an alternating current (AC) output voltage which is rectified by a rectifier 11, wherein a rectified output voltage of the rectifier 11 is provided to an energy storage element 12, e.g. a battery or an accumulator, or to a network of the vehicle, in particular a traction network, for example to a DC voltage link of the network.

FIG. 3 shows a layout of another inductive power transfer system 1 according to the state of the art. The inductive power transfer system 1 comprises an AC voltage source 13 which provides an AC voltage to an input voltage generating means 3 (see FIG. 2). An output voltage of said input voltage generating means 3 provides the input voltage for a WPC 4.

The remaining elements, namely the high frequency transformer 10, the rectifier 11 and the energy storage element 12 are connected to the WPC 4 as explained with reference to FIG. 1.

In the layout according to FIG. 3, the input voltage generating means 3 rectifies the AC input voltage, wherein step-up converter 7 generates an output voltage and (in contrast to the layout shown in FIG. 1) provides a correction of the power factor.

The adjustment range of the output voltage of the step-down converter 9 of the input voltage generating means 3 has to cover the complete charging voltage range of the energy storage element in order to charge energy storage element 12 from a minimal voltage $U_{min}$ to a maximal voltage $U_{max}$ or the complete operating voltage range of the aforementioned network of the vehicle. This, however, is only providable by additionally using the step-up converter 7 in the aforementioned two-stage layout since the step-up converter 7 allows varying an input voltage of the step-down converter 9.

Further, an input current of the energy storage element 12 can be limited, e.g. depending on a state of charge of said energy storage element 12. The step-down converter 9 controls its output voltage depending on an actual input current of the energy storage element 12 such that the maximal input current is not exceeded.

The two-step layout of the input voltage generating means 3 shown in FIG. 2 and used in the layouts shown in FIG. 1 and FIG. 3 has the disadvantage that each step, namely the step-up conversion by the step-up converter 7 and the step-down conversion by the step-down converter 9 generate power losses. Such losses increase in the case that voltage levels of the DC input voltage of the step-up converter 7 and the DC output voltage of the step-up converter 7 are different.

SUMMARY OF THE INVENTION

It is an object of the invention to provide a method of operating an inductive power transfer system for transferring power to a vehicle and such an inductive power transfer system wherein power losses during the energy transfer, a layout complexity and costs of the inductive power transfer system are reduced.

It is a basic idea of the present invention to adjust a gap size between a primary winding structure and a secondary winding structure of the inductive power transfer system to prepare or to initiate or to control an energy transfer process depending on charging characteristics of the at least one vehicle-sided energy storage element.

A method of operating an inductive power transfer system for transferring power, e.g. from a primary side system to a secondary side system, in particular to a vehicle, is proposed.

The present invention can be applied in particular to the field of energy transfer to any land vehicle, e.g. track bound vehicles such as rail vehicles (e.g. trams), but in particular to road automobiles, such as individual (private) passenger cars or public transport vehicles (e.g. busses). Transfer of energy can be performed if the vehicle is at a halt, i.e. does not move, (static charging) or if the vehicle moves (dynamic charging).

The inductive power transfer system comprises a primary winding structure for generating an alternating electromagnetic field and a secondary winding structure for receiving the alternating electromagnetic field. Further, the secondary winding structure generates an alternating current output voltage upon receiving the alternating electromagnetic field generated by the primary winding structure. Also, the secondary winding structure generates an alternating output current upon receiving the alternating electromagnetic field. The alternating electromagnetic field which is provided by the primary winding structure or the alternating electromagnetic field which results from a superposition of the electromagnetic field generated by the primary winding structure and the electromagnetic field generated by the secondary winding structure during reception of the electromagnetic field generated by the primary winding structure can be referred to as power transfer field.

The primary winding structure can be a way-sided or route-sided primary winding structure, wherein the secondary winding structure can be a vehicle-sided winding structure.

The alternating current output voltage of the secondary winding structure is rectified, e.g. by a rectifier. The rectified output voltage is supplied to at least one energy storage element which can also be referred to as energy storage module. The rectified output voltage denotes the output voltage provided by the rectifier, wherein the rectifier is a vehicle-sided element. Moreover, the alternating output current of the secondary winding structure can also be rectified and supplied to the energy storage element. Depending on the design of the secondary winding structure, the secondary winding structure can provide a voltage source or a current source.

The energy storage element can be an electric element of an electric network of the vehicle, in particular a capacitive element. In particular, the energy storage element can be an element of a DC part of the vehicle-sided electric network.

The energy storage element can e.g. be a battery or an accumulator, in particular a traction battery of the vehicle. Alternatively or in addition, the energy storage element can be a capacitive element, in particular an intermediate circuit capacitor, of a vehicle-sided electric network, e.g. an intermediate circuit. The intermediate circuit can be a portion of a vehicle-sided traction network. The rectified voltage or the intermediate circuit voltage can e.g. be supplied to a vehicle-sided converter, wherein the vehicle-sided converter generates an AC voltage for operating a vehicle-sided electric machine and/or any other vehicle-sided appliance. Thus, the rectified output voltage can be used to transfer electric power to the vehicle-sided electric network, e.g. the battery, in particular the traction battery, of the vehicle in order to charge said battery. Alternatively or in addition, the rectified output voltage can be used to transfer electric power to the electric machine via the intermediate circuit capacitor in order to operate the electric machine. This can be referred to as dynamic energy transfer.

It is, of course, possible that the traction battery is electrically connected to the intermediate circuit capacitor.

The rectified output voltage of the secondary winding structure can also be referred to as transfer voltage, rectified voltage or DC link voltage. The rectified output current of the secondary winding structure can also be referred to as transfer current or rectified current.

The rectified output voltage and/or output current is adjusted by varying a gap size of a gap between the primary winding structure and the secondary winding structure. This means that either the transfer voltage or the transfer current or both can be adjusted to desired values by varying the gap size. The gap comprises an air gap between a primary unit which comprises said primary winding structure and a secondary unit, i.e. receiving device, comprising said secondary winding structure. The air gap can e.g. be a gap between a surface, e.g. an upper surface, of the primary unit, e.g. an upper surface of a housing of the primary unit, and a surface, e.g. a bottom surface, of the receiving device, e.g. a bottom surface of a housing of the receiving device. The receiving device can be attached to the vehicle, e.g. to a bottom side of the vehicle. It is, however, also possible to attach the receiving device to any other part of the vehicle, e.g. to a roof portion of the vehicle.

According to the invention, the gap size is adjusted in order to prepare an energy transfer process, in particular an energy transfer process from the primary side to the secondary-sided electric network. Preparing a transfer process can mean that the gap size is adjusted before the beginning of a transfer process. The transfer process can denote a process of transferring energy to the aforementioned vehicle-sided electric network, e.g. battery, e.g. traction battery, and/or to the aforementioned capacitive element, e.g. the intermediate circuit capacitor. If the transfer process is used for charging an energy storage element, it can also be referred to as charging process. In this case, the transfer voltage can also be referred to as charging voltage and the transfer current can also be referred to as charging current.

Preparing the energy transfer process can also mean that the gap size is adjusted such that a desired rectified output voltage and/or output current is provided, wherein no energy transfer from the primary side to the secondary side is performed yet. In particular, the gap size can be adjusted such that the desired rectified output voltage is smaller than or equal to an actual output voltage of the energy storage element. In this case, no transfer current will be provided to the energy storage element.

Alternatively or in addition, the gap size can be adjusted in order to initiate an energy transfer process. In this case, the gap size can be adjusted such that the desired rectified output voltage is higher than the actual output voltage of the energy storage element. In this case, a transfer current is supplied to the energy storage element. A transfer current can denote a current which flows into the energy storage element.

Alternatively or in addition, the gap size is adjusted in order to control the energy transfer process. In this case, the gap size can be adjusted during the energy transfer process. In particular, the gap size can be adjusted such that at least one desired transfer parameter, e.g. a desired output power, output voltage and/or output current of the secondary winding structure, is provided. It is, for instance, possible to adjust the gap size such that a desired output power, output current and/or output voltage is maintained or corresponds to a desired time course of the transfer parameter.

The gap size is adjusted depending on charging characteristics of the at least one energy storage element. In particular, the gap size can be adjusted depending on a state of charge (SOC) of the energy storage element. Depending on the SOC, an actual total storage element voltage, e.g. an open circuit voltage, of the energy storage element can be determined, wherein the desired rectified output voltage can be determined in order to prepare or to initiate or to control an energy transfer process, wherein the gap size can be adjusted such that the desired rectified output voltage is provided.

Adjusting the gap size changes a voltage ratio of the high frequency transformer. Thus, the rectified output voltage will be adjusted by varying the voltage ratio of the high frequency transformer provided by the primary winding structure and the secondary winding structure. Hence, the variable gap size provides a first manipulating variable in order to provide a desired rectified output voltage.

In summary, adjusting the gap size in order to prepare an energy transfer process or to initiate or to control an energy transfer process depending on charging characteristics of the at least one energy storage element advantageously allows using a smaller voltage adjustment range of an input voltage provided to a wayside power converter (WPC) which provides an AC input voltage for the primary winding structure.

This, in turn, advantageously allows using only one input voltage generating element, e.g. only a step-up converter or only a step-down converter, wherein a two-stage input voltage generating means according to the state of the art is reduced to a one-stage input voltage generating means. This advantageously decreases power losses during the inductive power transfer system, reduces a complexity of the inductive power transfer system, costs and building space requirements.

In a preferred embodiment, the rectified output voltage and/or rectified output current is additionally adjusted by adjusting a least one field characteristic of the power transfer field. In particular, the at least one field characteristic can e.g. be a field strength.

Preferably, the at least one field characteristic can be adjusted by adjusting at least one operating parameter of a primary-sided circuit element, in particular at least one operating parameter of the WPC and/or the input voltage generating element. The at least one operating parameter of the WPC can e.g. be a duty cycle of the WPC, an operating frequency of the WPC and/or a phase shift between the voltages generated by the WPC.

This means that the rectified output voltage and/or output current (transfer voltage, transfer current) is/are controlled by at least two manipulating variables, wherein the first manipulating variable is the variable gap size and a second manipulating variable is the at least one field characteristic of the power transfer field.

In a preferred embodiment, the rectified output voltage is additionally adjusted by adjusting an input voltage of a wayside power converter. In this case, the inductive power transfer system can comprise the WPC, wherein an input voltage of the WPC is provided by an output voltage of the aforementioned input voltage generating means and an output voltage of the WPC is provided to the primary winding structure.

This means that the rectified output voltage and/or output current (transfer voltage, transfer current) is/are controlled by at least two manipulating variables, wherein the first manipulating variable is the variable gap size and a second manipulating variable is the input voltage of the WPC which can e.g. be varied by the input voltage generating means.

It is, for instance, possible to provide a coarse adjustment of the rectified output voltage by varying the gap size, in particular with a constant WPC input voltage. A coarse adjustment can e.g. be performed by adjusting the rectified output voltage such that the rectified output voltage differs not more than a predetermined first threshold value from a desired rectified output voltage. After said coarse adjustment, a fine adjustment can be provided by adjusting the input voltage of the WPC, e.g. by adjusting an output voltage of the input voltage generating means. A fine adjustment can e.g. mean that the rectified output voltage differs not more than a second threshold value from the desired rectified output voltage, wherein the second threshold value is smaller than the first threshold value.

In particular, a coarse adjustment by varying the gap size can be provided such that the rectified output voltage is within a first voltage interval around the desired rectified output voltage, wherein the fine adjustment by adjusting the input voltage of the WPC is provided such that the rectified output voltage is within a second voltage interval around the desired rectified output voltage, wherein the second voltage interval is smaller than the first voltage interval.

This advantageously allows a precise adjustment of the rectified output voltage according to charging characteristics of the at least one energy storage element, wherein, as explained before, a voltage adjustment range of the WPC input voltage which can be proportional to an output voltage adjustment range of an input voltage generating means can be small.

The input voltage of the WPC can be limited to a voltage within a predetermined voltage interval with a predetermined minimal input voltage and a predetermined maximal input voltage. Said voltage interval can e.g. depend on characteristics of the chosen input voltage generating means.

In another embodiment, the gap size is adjusted such that a desired rectified output voltage and/or rectified output current is provided, in particular given an input voltage, e.g. a constant input voltage, of the WPC. After the gap size has been adjusted, the gap size is held constant as long as a desired (varying) rectified output voltage is providable by adjusting the input voltage of the WPC, wherein the input voltage of the WPC is only adjustable between given voltage limits.

It is, for instance, possible to adjust the gap size such that an energy transfer process is prepared. In this case, the gap size is adjusted such that for a given, in particular constant, WPC input voltage, the rectified output voltage is equal to an actual total storage element voltage of the energy storage element or smaller, in particular not smaller than a predetermined amount, than the actual output voltage of the energy storage element. In this case, as explained before, no charging is performed. The total storage element voltage of the energy storage element can denote a voltage provided by the storage element, in particular an open circuit voltage of the storage element.

Alternatively, a gap size can be adjusted such that an energy transfer process is initiated. In this case, the gap size is adjusted such that the rectified output voltage is higher, but in particular not higher than a predetermined amount, than the actual total storage element voltage of the energy storage element.

After the adjustment of the gap size, the gap size is held constant, while the input voltage of the WPC is varied, e.g. increased, in order to perform charging of the energy storage element according to charging characteristics.

The gap size can e.g. be held constant until a maximal voltage limit of the input voltage of the WPC is reached.

Hence, an energy transfer process can comprise one or multiple phase(s). If an adjustment range of the WPC input voltage, e.g. the range between the given voltage limits, provides a voltage range required to provide a desired charging process, e.g. the voltage range required to reach a desired state of charge, e.g. a maximal state of charge, the gap size can only be adjusted once, e.g. in order to prepare the energy transfer process or in order to initiate the energy transfer process. In this case, the energy transfer process comprises only one phase.

If the voltage adjustment range of the WPC input voltage does not provide a required voltage range for performing a desired charging process, the gap size can additionally be adjusted during the energy transfer process, in particular if the WPC input voltage reaches a maximal voltage limit. In this case, the energy transfer process consists of at least two phases, wherein the gap size can be held constant for each phase but can be varied between the phases, e.g. at the transition from one phase to another.

This advantageously allows a simple control of the rectified output voltage according to given charging characteristics of the energy storage element.

It is, however, also possible to adjust the gap size continuously.

In a preferred embodiment, the gap size is adjusted such that a minimal input voltage of the WPC is transformed into a desired rectified output voltage or such that a difference between a desired rectified output voltage and the rectified output voltage due to the minimal input voltage of the WPC is smaller than a predetermined threshold value.

The gap size can, as explained before, be adjusted in order to initiate an energy transfer process or in order to prepare an energy transfer process. This means that the complete voltage adjustment range is provided at the beginning of the energy transfer process or the beginning of one phase of a multi-phase charging process. This, in turn, reduces the need for adjusting the gap size.

In another embodiment, the gap size is adjusted, in particular adjusted again, if the input voltage of the WPC reaches a maximal voltage limit. The maximal voltage limit can correspond to the voltage limit of the voltage adjustment range of the input voltage of the WPC. The maximal voltage limit can also be smaller than said voltage limit.

If the input voltage of the WPC reaches the maximal voltage limit, it is possible to adjust the gap size such that the rectified output voltage given the actual input voltage of the WPC equals to an actual total storage element voltage of the energy storage element or does not differ more than a predetermined amount from said output voltage. It is, simultaneously or sequentially possible to change, e.g. to decrease, the input voltage of the WPC to a minimal voltage wherein the gap size is adjusted such that the rectified output voltage given said minimal input voltage of the WPC equals to an actual total storage element voltage of the energy storage element or does not differ more than a predetermined amount from said total storage element voltage. In particular, the gap size can be adjusted in order to prepare or to initiate a following phase of the energy transfer process.

It is, of course, possible to alternatively keep the WPC input voltage constant or adjust a WPC input voltage to a predetermined value and to adjust the gap size given the actual WPC input voltage such that a desired charging process can be performed, in particular within one phase of the charging process.

In a preferred embodiment, the gap size is adjusted such that the rectified output voltage is equal to an actual total storage element voltage of the at least one energy storage element, in particular given a, e.g. constant, WPC input voltage. The total storage element voltage can e.g. be an open circuit voltage of the element. Such an adjustment can e.g. be provided before the energy transfer process or before a following phase of the energy transfer process, in particular in order to prepare the energy transfer process of the following phase. In this case, the gap size is adjusted such that no transfer current is provided to the at least one energy storage element.

As the adjustment of the rectified output voltage by adjusting the gap size may only result in a coarse adjustment and thus, requirements of a desired charging process can be violated, the energy transfer process can be advantageously prepared by adjusting the gap size while the actual charging process in then controlled by a fine adjustment of the WPC input voltage. This advantageously allows a reliable charging of the at least one energy storage element.

In another embodiment, the gap size is varied continuously or gradually. In the case that the gap size is varied continuously, the gap size can be adjusted to each size of a predetermined size interval. In the case that the gap size is varied gradually, the gap size can only be adjusted to a subset of all possible sizes of the size interval, e.g. to two predetermined gap sizes.

Varying the gap size gradually advantageously simplifies a design of corresponding positioning means which will be explained later. Varying gap size continuously advantageously allows providing a larger range of desired rectified output voltages.

In another embodiment, the input voltage of the WPC is provided by a step-up converter. The step-up converter can provide the single voltage conversion element in an electric connection between the WPC and the voltage supply means. In this case, only the step-up converter can be electrically arranged between a way-sided power supply means and the WPC. In particular, the input voltage of the WPC can only be adjusted only by the step-up converter.

Alternatively, the input voltage of the wayside power converter is provided by a step-down converter. The step-down converter can provide the single voltage conversion element in an electric connection between the WPC and the voltage supply means. As explained with reference to the step-up converter, only the step-down converter can be electrically arranged between a voltage supply means and the WPC. In particular, the input voltage of the WPC can only be adjusted by the step-down converter.

Moreover, the input voltage of the wayside power converter can be provided by a combination of a step-up converter and a step-down converter, e.g. a serial connection of the both converters.

In summary, a one-stage input power generating means for the WPC can be provided. This advantageously uses power losses during inductive power transfer.

In another embodiment, the gap size is varied by a secondary side positioning means. The secondary side positioning means can e.g. allow a positioning of a secondary winding structure or a receiving device (or a part thereof) comprising the secondary winding structure. Alternatively or in addition, the gap size is varied by a primary side positioning means. The primary sided positioning means can e.g. allow a positioning of the primary winding structure or a primary unit (or part thereof) comprising the primary winding structure.

The secondary side positioning means and/or the primary side positioning means can e.g. be provided such that a position of the secondary winding structure and/or the primary winding structure can be varied in a first direction, wherein the first direction can correspond to a main direction of propagation of the alternating electromagnetic field generated by the primary winding structure during power transfer. The first direction can e.g. be a vertical direction, wherein the vertical direction can e.g. be oriented orthogonal to a plane surface of a route. The vertical direction can e.g. be oriented parallel to a yaw axis of the vehicle.

Additionally, the primary side positioning means can allow a positioning of the primary winding structure in a second direction and/or a third direction. The second direction can e.g. be parallel to a direction of extension of the primary winding structure. The second direction can e.g. be a longitudinal direction. The third direction can be oriented orthogonal to the first and/or the second direction. The third direction can e.g. be a lateral direction. Moreover, the primary side positioning means can also allow for a rotation of the corresponding winding structure. It is, for instance, possible that the primary positioning means can allow a rotation of the primary winding structure about the aforementioned first direction and/or second direction and/or third direction.

Correspondingly, the secondary side positioning means can allow a positioning of the secondary winding structure in a second direction and/or a third direction. The second direction can e.g. be parallel to a direction of extension of the secondary winding structure. The second direction can e.g. be a longitudinal direction, in particular of the vehicle carrying the secondary winding structure. The longitudinal direction can e.g. be parallel to a roll axis of the vehicle. The third direction can be oriented orthogonal to the first and/or the second direction. The third direction can e.g. be a lateral direction, in particular of the vehicle carrying the secondary winding structure. The lateral direction can be parallel to pitch axis of the vehicle. Moreover, the secondary side positioning means can also allow for a rotation of the corresponding winding structure. It is, for instance, possible that the primary positioning means can allow a rotation of the primary winding structure about the aforementioned first direction and/or second direction and/or third direction.

In an aligned state of the primary and secondary winding structure, the respective directions on the primary side and the secondary side can be oriented parallel.

Thus, the primary side positioning means and/or the secondary side positioning means can allow a vertical positioning and/or a longitudinal positioning and/or a lateral positioning of the corresponding winding structure and, if applicable, a rotation about the corresponding axes.

In summary, the positioning means can be controlled such that a desired gap size and, as a result, a desired rectified output voltage is provided.

A primary side positioning means is e.g. described in GB 1403547.1 which is incorporated by reference into this disclosure. In particular, an inductive power transfer pad can comprise a stationary part and a movable part, wherein the movable part comprises a primary winding structure, wherein the movable part is movable between a retracted state and an extended state. Moreover, the power transfer pad can be designed and/or controllable such that the movable part is only movable to a position from a set of predetermined positions, wherein the set of predetermined positions is a subset of the set of all positions between the retracted and the extended state. Further, the movable part can be only movable to the retracted state or to the extended state. It is, however, also possible that the movable part can be moved to each position between the retracted and the extended state.

A secondary side positioning means is e.g. described in PCT/EP2013/067414 which is incorporated into this disclosure by reference. In particular, an inductive pick-up arrangement to be mounted on an electric vehicle which shall be operated with electric energy produced by the arrangement by magnetic induction, can comprises a pick-up portion comprising at least one electric inductance for receiving a magnetic field, e.g. a secondary winding structure, and for generating the electric energy. Further, the arrangement can comprises a mounting portion to be mounted on the vehicle and at least one actuator or a set of at least two actuators for actuating movement of the pick-up portion relative to the mounting portion, wherein the mounting portion and the pick-up portion are moveably connected to each other by at least one connecting portion. The actuator or the set of actuators can be actuated such that the pick-up portion is moved in a vertical direction. Alternatively or in addition, the actuator or the set of actuators can be actuated such that the pick-up portion is additionally or alternatively moved in a longitudinal and/or a lateral direction.

Further, the first actuator can comprise a prolongable section which can be prolonged and shortened by operating the first actuator, wherein the prolongable section is prolonged or shortened in a first direction of movement. Also, the arrangement can comprise a second actuator, wherein the second actuator comprises a prolongable section which can be prolonged and shortened by operating the second actuator, wherein the prolongable section is prolonged or shortened in a second direction of movement, wherein at least one of the first and second direction of movement contains a lateral portion.

The actuator or the set of actuators can be actuated such that the pick-up portion is moved in a vertical direction and/or in a lateral direction and/or in a longitudinal direction depending on an output voltage of the electric inductance, e.g. the secondary winding structure, mounted on the pick-up portion, e.g. the output voltage of the secondary winding structure, in particular the rectified output voltage. Movement can be provided such that a desired output voltage is provided.

Thus, three configurations are possible. In a first configuration, the gap size can only be varied by a secondary side positioning means. In a second configuration, the gap size can only be varied by primary side positioning means. In a third configuration, the gap size can be varied by both, a secondary side positioning means and a primary side positioning means.

In another embodiment, the input voltage of the WPC is controlled depending on a deviation between a desired transfer current and an actual transfer current.

The actual transfer current can e.g. be determined via a current sensing means, e.g. a current sensor, on the secondary side. Information on an actual transfer current can e.g. be transmitted to the primary side via at least one communication means, e.g. from a secondary side control unit to a primary side control unit. It is, for instance, possible that the desired transfer current is determined by a battery or vehicle management system. A vehicle-sided current control unit or a wayside control unit can determine a deviation, e.g. a difference, between the actual input current and the desired input current. Depending on said deviation, a set point for a way-sided control unit of the WPC input voltage generating means can be determined.

The set point can be transmitted from the vehicle side to the primary side. In this case, the charging control unit is located on the vehicle side. Depending on the transmitted set point, the WPC input voltage control unit can control the input voltage generating means, e.g. an output voltage of the input voltage generating means.

This, however, is only an example. As mentioned before, it is, for instance, also possible to determine a set point for operating parameters of the WPC in order to adjust the transfer voltage, e.g. for a duty cycle of the WPC, an operating frequency of the WPC and/or a phase shift between the voltages generated by the WPC.

In general, the set point can denote a parameter for controlling the voltage which is induced within the secondary winding structure. The set point can e.g. be provided as a voltage value, a current value or a power value.

The set point or an information on the deviation between the desired transfer current and the actual transfer current can be transmitted from the vehicle side to the primary side via a unidirectional communication.

In another preferred embodiment, a deviation between a desired input power of the WPC and an actual input power of the WPC is determined. The desired input power of the WPC is determined depending on a deviation between a desired input power of the energy storage element and the actual input power of the energy storage element. Said deviation between the desired and the actual input power of the energy storage element can also be determined on the wayside, e.g. by a way-sided evaluation or control unit, or on the vehicle side.

A desired input current of the WPC is determined depending on a deviation between the desired input power and the actual input power of the WPC. Said desired input current can also be determined on the wayside or the vehicle side. An input voltage of the WPC is controlled depending on the desired input current of the WPC. Controlling the input voltage can also be performed on the wayside, e.g. by the aforementioned or another way-sided control unit.

Hence, the inductive power transfer system can comprise three control units on the wayside. A first control unit determines the desired input power of the WPC based on the deviation between the desired and the actual input power of the energy storage element. A second control unit, which can also be referred to as inner control unit, determines a desired input current of the WPC based on the deviation between the desired input power and actual input power of the WPC. A third control unit then controls the operation, e.g. the output voltage, of the input voltage generating means, e.g. the step-up converter, depending on the desired input current of the WPC.

The first control unit, which can also be referred as outer control unit, presents a power controller which reduces the deviation between the desired and the actual input power of the energy storage element. The deviation determined by the first control unit is proportional to losses in the inductive power transfer system. The second, inner control unit provides a power limiting means which is able to quickly or rapidly change the output voltage of the input voltage generating means in order to keep the output power of the input voltage generating means constant, e.g. in case that the power transmission path from the wayside to the vehicle side changes, in particular if the previously explained voltage ratio of the high frequency transformer changes. The second, inner control unit provides the set point for the control unit of the input voltage generating means. The control unit of the input voltage generating means can also be referred to as third control unit.

It is possible to transmit an actual input power and a desired input power or information thereon from the vehicle side to the wayside, e.g. to the first control unit. Said power can e.g. be determined using sensing means or by an energy management system of the vehicle. It is, for instance, possible to sense an actual input current and an actual input voltage of the at least one energy storage element and to transmit these values from the vehicle side to the wayside. Also, desired current and voltage values can be transmitted from the vehicle side to the wayside. On the wayside, e.g. by the first control unit, the corresponding desired and actual input power can be determined and the corresponding deviation. Based on the deviation, a desired output power of the input voltage generating means can be determined.

The actual output current of the input voltage generating means can also be sensed, e.g. by a current sensor, and fed back to the second and the third control unit. Also, an output voltage of the input voltage generating means, which corresponds to the input voltage of the WPC, can be sensed, e.g. by a voltage sensor and fed back to the second and/or the third control unit. The actual output current and the actual output voltage of the input voltage generating means allows to determine an actual output power of the input voltage generating means.

On the base of the outer and the inner control unit, it is advantageously ensured that the input power and the input current of the energy storage element is not exceeded as the power is limited or controlled on the wayside.

This advantageously avoids implementing a bidirectional communication between the wayside and the vehicle side as the wayside controllers provide the aforementioned limitation.

In a preferred embodiment, an actual transfer current, a desired transfer current and an actual transfer voltage are transmitted from the secondary side to the primary side via a unidirectional communication. This advantageously provides a very fast communication which, in turn, ensures to meet safety requirements. Moreover, primary-sided safety measures can be initiated if the communication is interrupted, in particular for a short time period. For instance, power limits can be provided for the primary-sided elements. In this case, even a communication interruption does not require to switch off the energy transfer since the system is self-limiting. The transfer current and the transfer voltage can correspond to the aforementioned input current and input voltage of the at least one energy storage element or the vehicle-sided electric network comprising the energy storage element.

Further proposed is an inductive power transfer system for transferring energy to a vehicle, wherein the inductive power transfer system comprises a primary winding structure for generating an alternating electromagnetic field and a secondary winding structure for receiving the alternating electromagnetic field and generating an alternating current output voltage. Further, the alternating current output voltage is rectifiable, e.g. by a rectifier of the inductive power transfer system, and supplyable to at least one energy storage element.

Further, the inductive power transfer system comprises at least one means for adjusting a gap size of a gap between the primary winding structure and the secondary winding structure, wherein the rectified output voltage is adjustable by varying the gap size.

According to the invention, the gap size is adjustable before in order to prepare and/or to initiate and/or to control an energy transfer process depending on charging characteristics of the at least one energy storage element.

The proposed inductive power transfer system can comprise one or multiple control units, in particular for controlling the gap size, the input voltage of the WPC, and other aforementioned manipulating variables.

The proposed inductive power transfer system advantageously allows performing the proposed method of operating the inductive power transfer system according to one of the previously explained embodiments.

In another embodiment, the inductive power transfer system comprises at least one input voltage generating means for providing an adjustable input voltage of a WPC, wherein the WPC is connected to a voltage supply means via the at least one means for adjusting the input voltage. The voltage supply means can e.g. be provided by a DC voltage supply means or an AC supply means, e.g. an external power network or a battery.

This advantageously allows adjusting the input voltage of the at least one energy storage element additionally by adjusting the input voltage of the WPC.

In another embodiment, the at least one input voltage generating means is provided by a step-up converter or a step-down converter or a combination thereof. This advantageously allows a simple design of the input voltage supply means.

In another embodiment, the at least one means for adjusting the gap size of a gap between the primary winding structure and the secondary winding structure is/are provided by a secondary side positioning means and/or a primary side positioning means. In this case, the inductive power transfer system can comprise one or both positioning means. As explained before, the positioning means can be operated in order to translate and/or rotate a primary winding structure and/or a secondary winding structure.

As explained before, the secondary side positioning means can be provided by a lifting device and/or a primary side positioning means can be provided by an actuating means.

In another embodiment, the inductive power transfer system comprises at least one means for a unidirectional communication between the secondary side and the primary side. Via said unidirectional communication, an actual and a desired transfer current and/or transfer voltage can be transmitted from the vehicle to the wayside.

BRIEF DESCRIPTION OF THE DRAWINGS

The invention will be explained with reference to the attached figures. The figures show.

DETAILED DESCRIPTION

Figure 1:
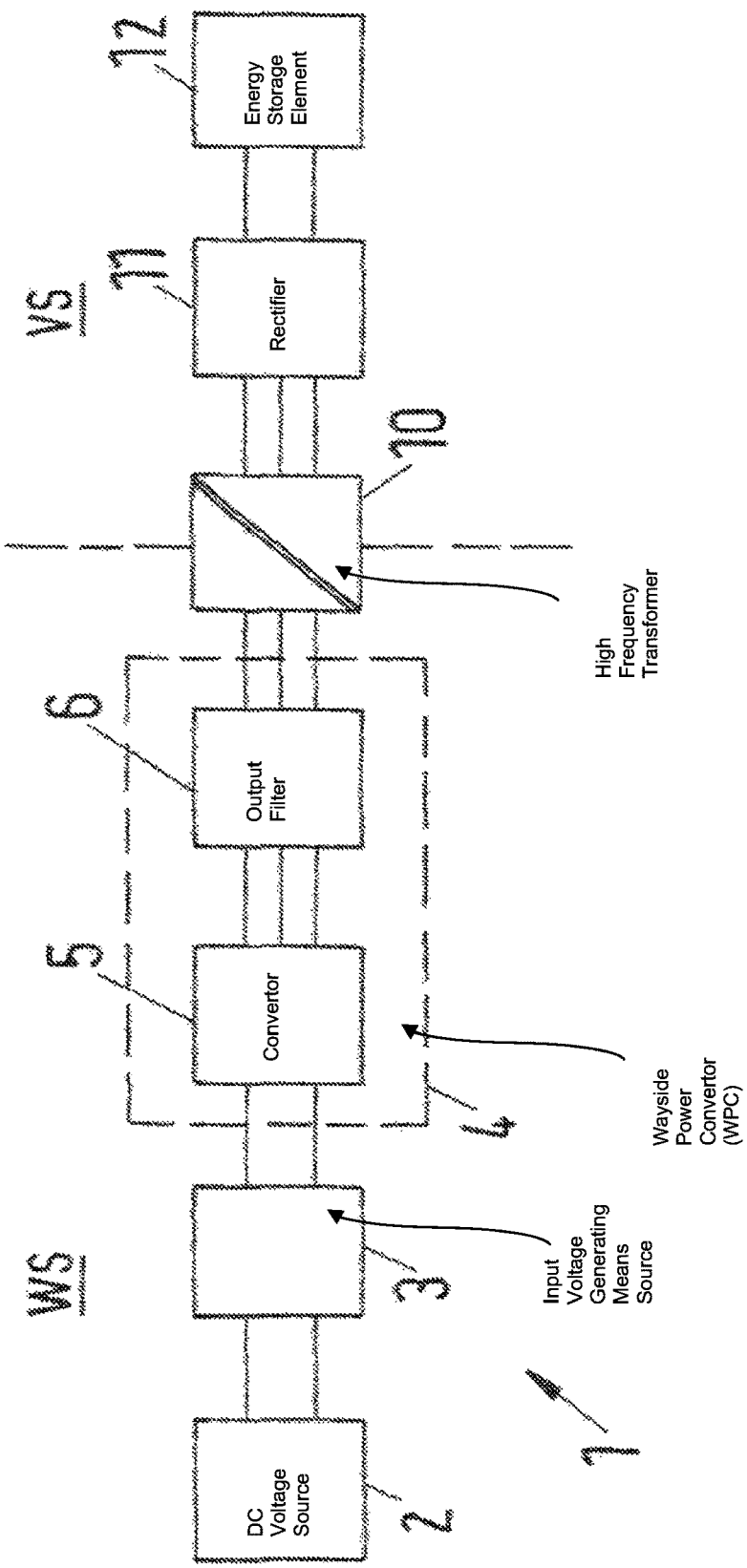
FIG. 1 a schematic layout of an inductive power transfer system according to the state of the art, FIG. 2 a schematic block diagram of an input voltage generating means according to the state of the art, FIG. 3 a schematic block diagram of an inductive power transfer system according to another embodiment according to the state of the art, FIG. 4 a schematic block diagram of an inductive power transfer system according to the invention, FIG. 5 a schematic control schema and FIG. 6 a schematic control schema according to another embodiment.
Figure 2:
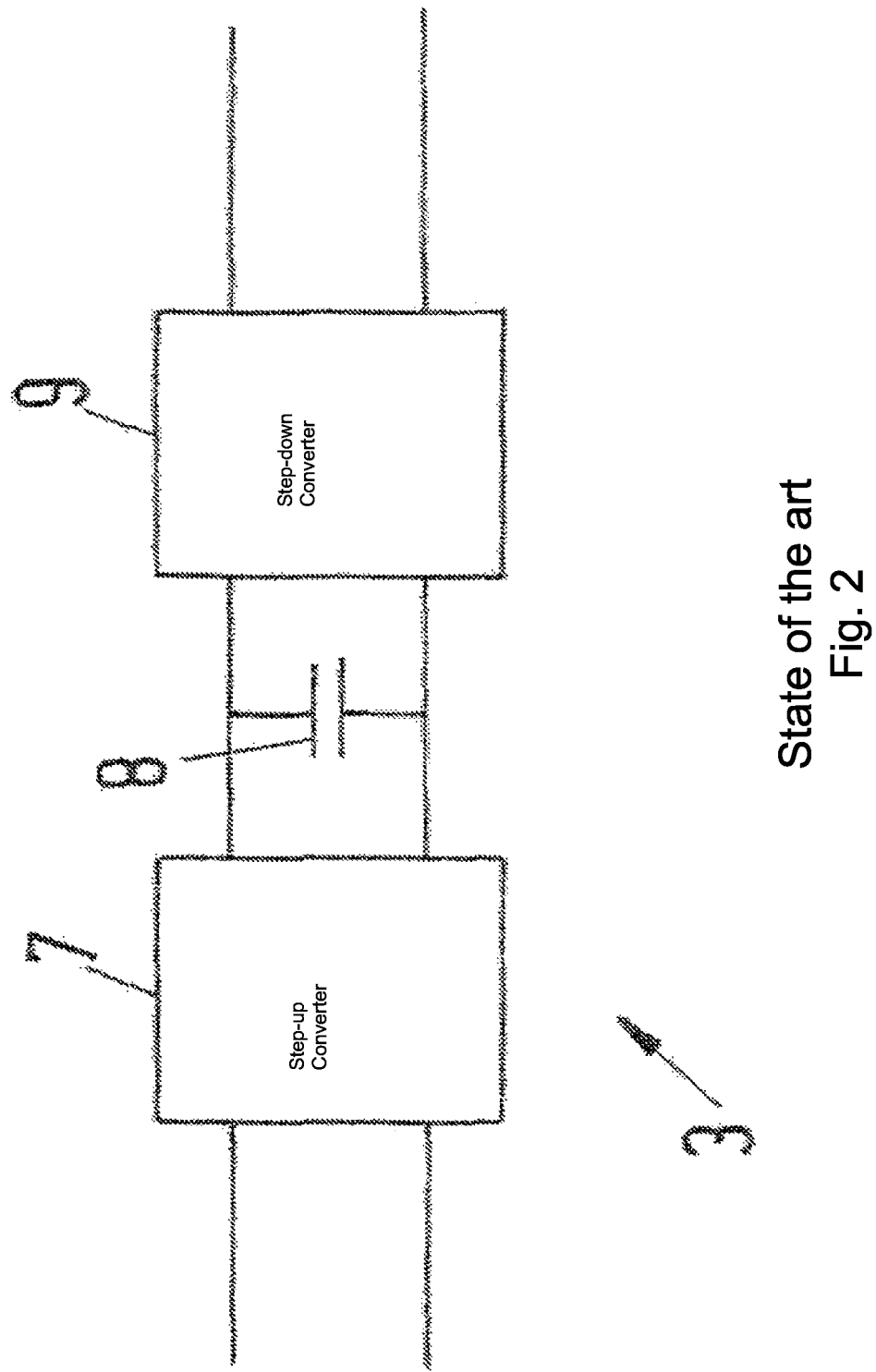
Figure 3:
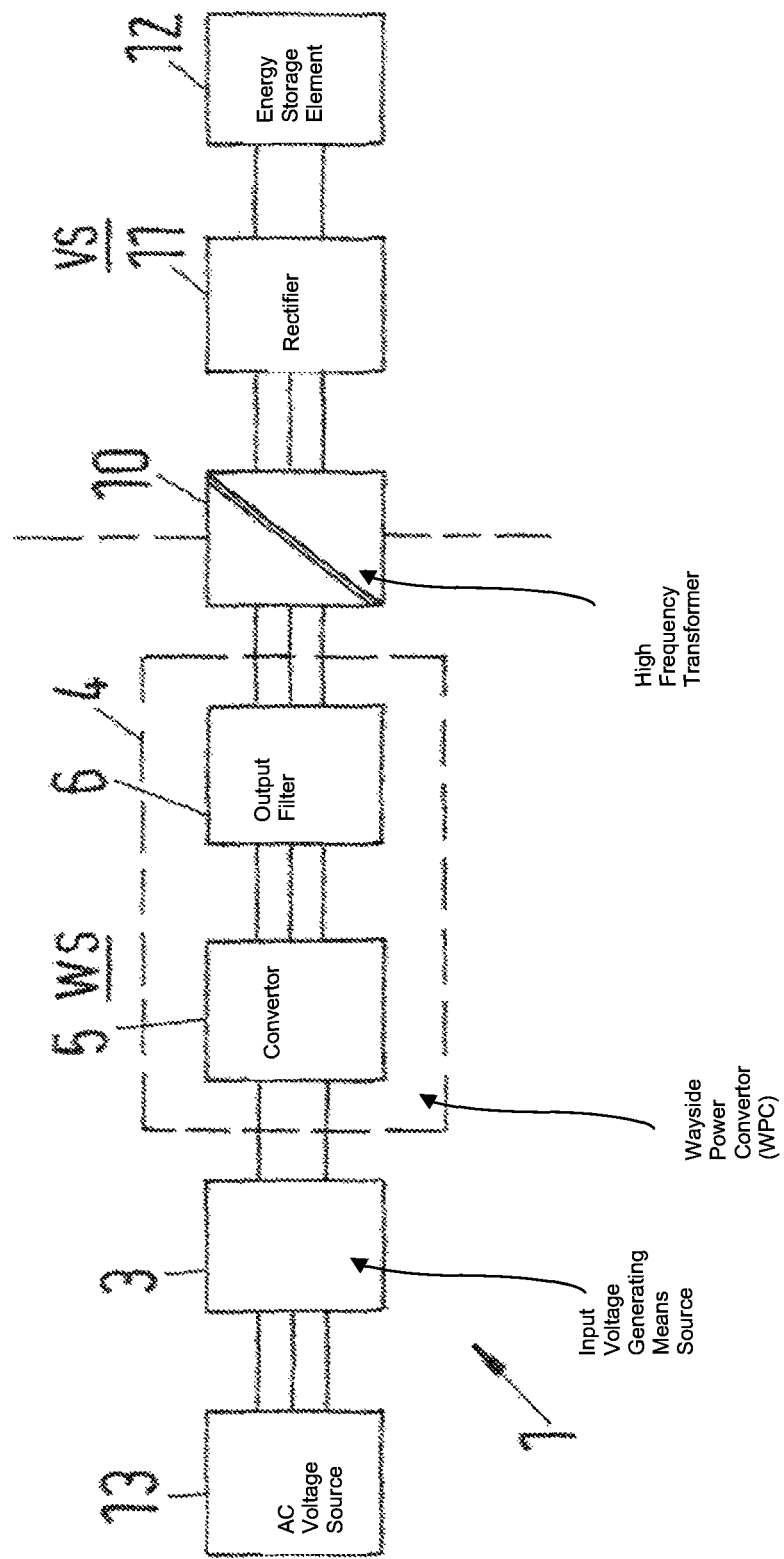
Figure 4:
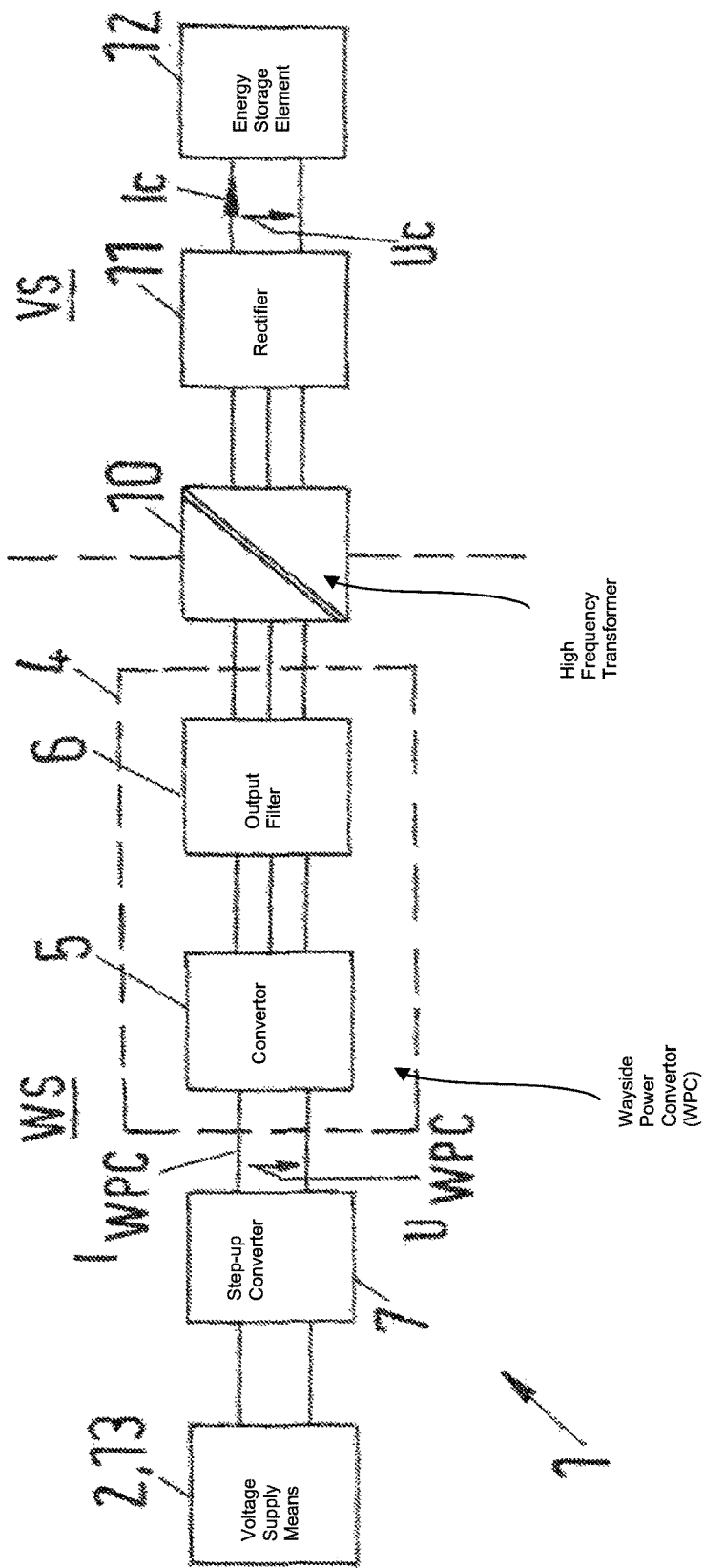

FIG. 4 shows a schematic block diagram of an inductive power transfer system 1 according to the invention. Indicated is a wayside WS and a vehicle side VS.

The inductive power transfer system 1 comprises a voltage supply means 2, 13 which can be designed as a DC voltage supply means or an AC voltage supply means. Further, the inductive power transfer system 1 comprises a step-up converter 7. The step-up converter 7 can have a predetermined output voltage adjustment range, wherein the output voltage adjustment range can e.g. range from a minimal voltage $U_{min}$ to a maximal voltage $U_{max}$.

The minimal voltage $U_{min}$ which is providable by the step-up converter 7 can be higher than the maximal input voltage of the step-up converter 7, e.g. higher than a maximal output voltage of the voltage supply means 2, 13. It is, for instance, possible that the minimal output voltage $U_{min}$ exceeds the maximal input voltage of the step-up converter 7 by an amount of an internal voltage drop of the step-up converter 7. In total, the step-up converter 7 can adjust the output voltage within the interval ranging from $U_{min}$ to $U_{max}$.

Moreover, the step-up converter 7 can be designed such that the minimal output voltage $U_{min}$ of the step-up converter 7 is higher than a minimal input voltage of the energy storage element 12. The energy storage element 12 can e.g.

be provided by a battery of the vehicle. Furthermore, the step-up converter 7 can be designed such that a maximal output voltage $U_{max}$ of the step-up converter 7 is smaller than a maximal input voltage of the energy storage element 12.

Further, the inductive power transfer system 1 comprises a wayside power converter (WPC) 4, wherein the WPC 4 comprises a converter 5 and an output filter 6.

The output voltage of the step-up converter 7 which provides an input voltage generating means equals to the input voltage of the WPC 4 (WPC 4 input voltage).

An output voltage of the WPC 4 is provided to a primary winding structure of a high frequency transformer 10 which also comprises a secondary winding structure for receiving the alternating electromagnetic field generated by the primary winding structure due to the applied WPC 4 output voltage. Further, the inductive power transfer system 1 comprises a rectifier 11 for rectifying the AC output voltage of the secondary winding structure. The rectified output voltage $U_C$ provides an input voltage of the energy storage element 12. A rectified output current $I_C$ provides an input current of the energy storage element 12. The input current $I_C$ can also be referred to as transfer current, wherein the input voltage $U_C$ can also be referred to as transfer voltage.

The voltage ratio r of the high frequency transformer 10 can be expressed as $$r = U_{WPC}/U_C = I_C/I_{WPC} \qquad \text{formula 1,}$$

wherein $I_{WPC}$ refers to an input current of the WPC 4 and $U_{WPC}$ refers to an input voltage of the WPC 4.

Not shown are positioning means for changing a position, in particular a vertical position, of a primary winding structure and/or the secondary winding structure of the high frequency transformer 10.

In order to prepare charging of the energy storage element 12, a state of charge (SOC) of the energy storage element 12 can be determined. Depending on a given or predetermined SOC voltage curve, a desired input voltage $U_{C,des}$ can be determined as the total storage element voltage of the energy storage element 12. The total storage element voltage of the energy storage element 12 can e.g. be the sum of an inner voltage and the voltage drop across inner resistances of the energy storage element 12. Preferably, however, a desired input current $I_{C,des}$ (see e.g. FIG. 5) can be determined such that the desired input voltage $U_{C,des}$ is provided, in particular such an allowable cell voltage is not exceeded for any of serially connected battery cells of the energy storage element 12.

Further, the step-up converter 7 can be controlled such that the minimal output voltage $U_{min}$ is provided to the WPC 4.

Then, the gap size between the primary and the secondary winding structure of the high frequency transformer 10 can be adjusted such that the rectified output voltage $U_C$ given the minimal input voltage $U_{WPC}$ of the WPC 4 equals to the desired input voltage $U_{C,des}$.

If, for instance, the desired input voltage $U_{C,des}$ is equal to 600 V and the minimal input voltage $U_{WPC}$ of the WPC 4 is equal to 650 V, the gap size between the primary and the secondary winding structure of the high frequency transformer 10 can be adjusted such that a voltage ratio r is equal to 1/1.083 (600 V/650 V). If this voltage ratio is exactly provided by adjusting the gap size, no transfer current $I_C$ will be provided to the energy storage element 12 since the desired input voltage $U_{C,des}$ is equal to the rectified output voltage $U_C$.

Thus, the energy transfer process is prepared by adjusting the gap size. Then, the output voltage of the step-up converter 7 (and thus the input voltage $U_{WPC}$ of the WPC 4) can be increased by controlling the step-up converter 7 accordingly. It is, for instance, possible to increase the output voltage of the step-up converter 7 until a desired transfer current $I_{C,des}$ which provides a desired charging process is provided to the energy storage element 12.

The gap size can be held constant during the increase of the output voltage of the step-up converter 7. If, however, the output voltage of the step-up converter 7 reaches a maximal output voltage $U_{max}$ and charging is not terminated, the gap size can be adjusted again. In this case, the output voltage of the step-up converter 7 can be decreased to the minimal output voltage $U_{min}$ and the gap size can then be adjusted such that, given the minimal input voltage $U_{WPC}$ of the WPC 4, a rectified output voltage $U_C$ which equals to an actual total storage voltage of the energy storage element 12 is provided to the energy storage element 12.

If a voltage adjustment range of the step-up converter 7 ranges e.g. from 650 V to 750 V and the energy storage element 12 has an input voltage range from 600 V to 750 V and complete charging is desired, the gap size has to be changed at least once during the complete charging process.

It is also possible to change the gap size during the energy transfer process continuously, wherein the voltage ratio r is continuously provided such that inductive power transfer system 1 is operated at an optimal operating condition. An optimal operating condition is e.g. provided if losses, current flowing through the coils of the primary or secondary winding structure and/or the magnetic stray field of the power transfer field is/are minimized. Further, an optimal operating condition can be provided if losses are spread between the primary side and the secondary side in a desired ratio, e.g. a ratio of 1:1. Further, an optimal operating condition can be provided if the power transfer efficiency is maximized.

Figure 5:
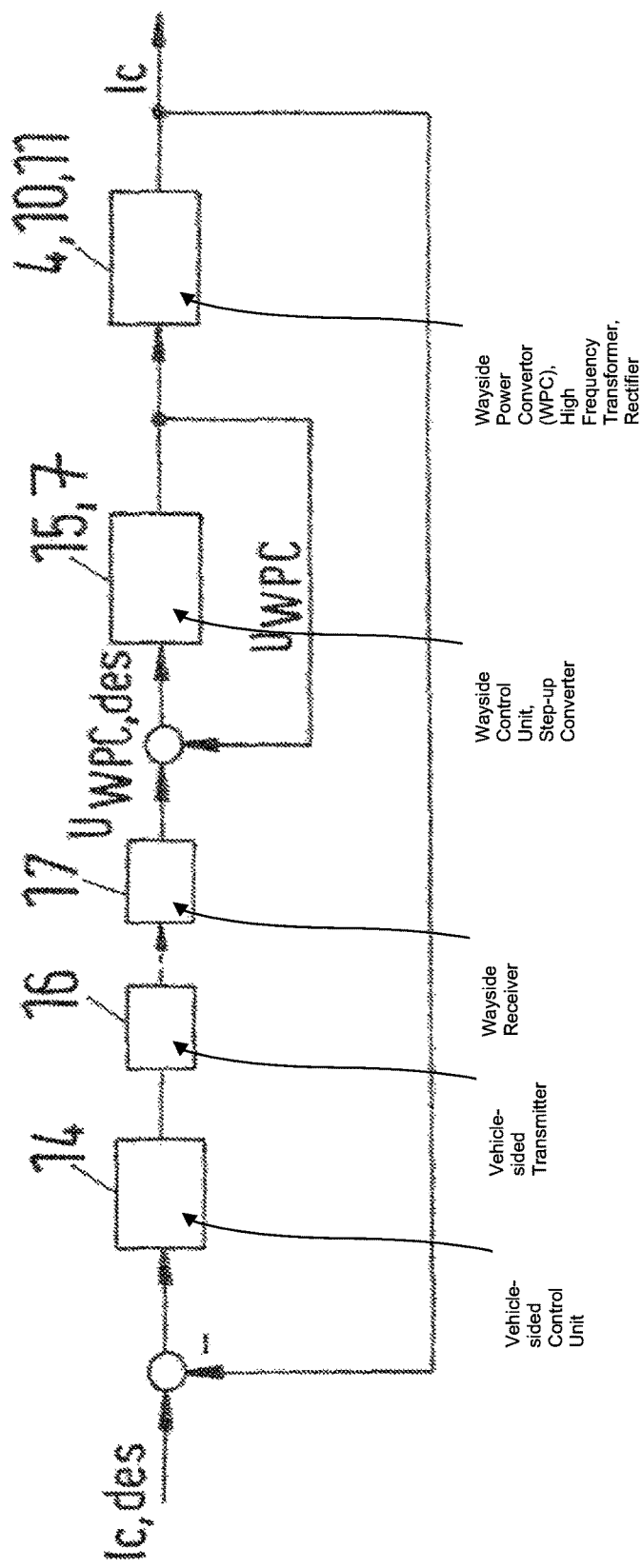

It is, of course, possible to use a step-down converter instead of the step-up converter 7. In FIG. 5, a first control schema according to the invention is illustrated. A desired transfer current $I_{C,des}$ can be determined, e.g. by an energy storage element management system of the vehicle. Further, an actual transfer current $I_C$ can be determined e.g. by sensing actual transfer current $I_C$. A vehicle-sided control unit 14 generates a set point for a wayside control unit 15, depending on the difference between the desired transfer current $I_{c,des}$ and the actual transfer current $I_c$, wherein the wayside control unit 15 controls an operation of the step-up converter 7 (see FIG. 4). The vehicle can comprise a transmitter 16, wherein the set point can be transmitted via the transmitter 16 to a wayside receiver 17, in particular via a unidirectional communication.

The set point can e.g. be a desired output voltage of the step-up converter 7 which equals to a desired input voltage $U_{WPC,des}$ of the WPC 4. The wayside control unit 15 controls the operation of the step-up converter 7 such that the actual input voltage $U_{WPC}$ of the WPC 4 is equal to the desired input voltage $U_{WPC,des}$ of the WPC 4.

Figure 6:
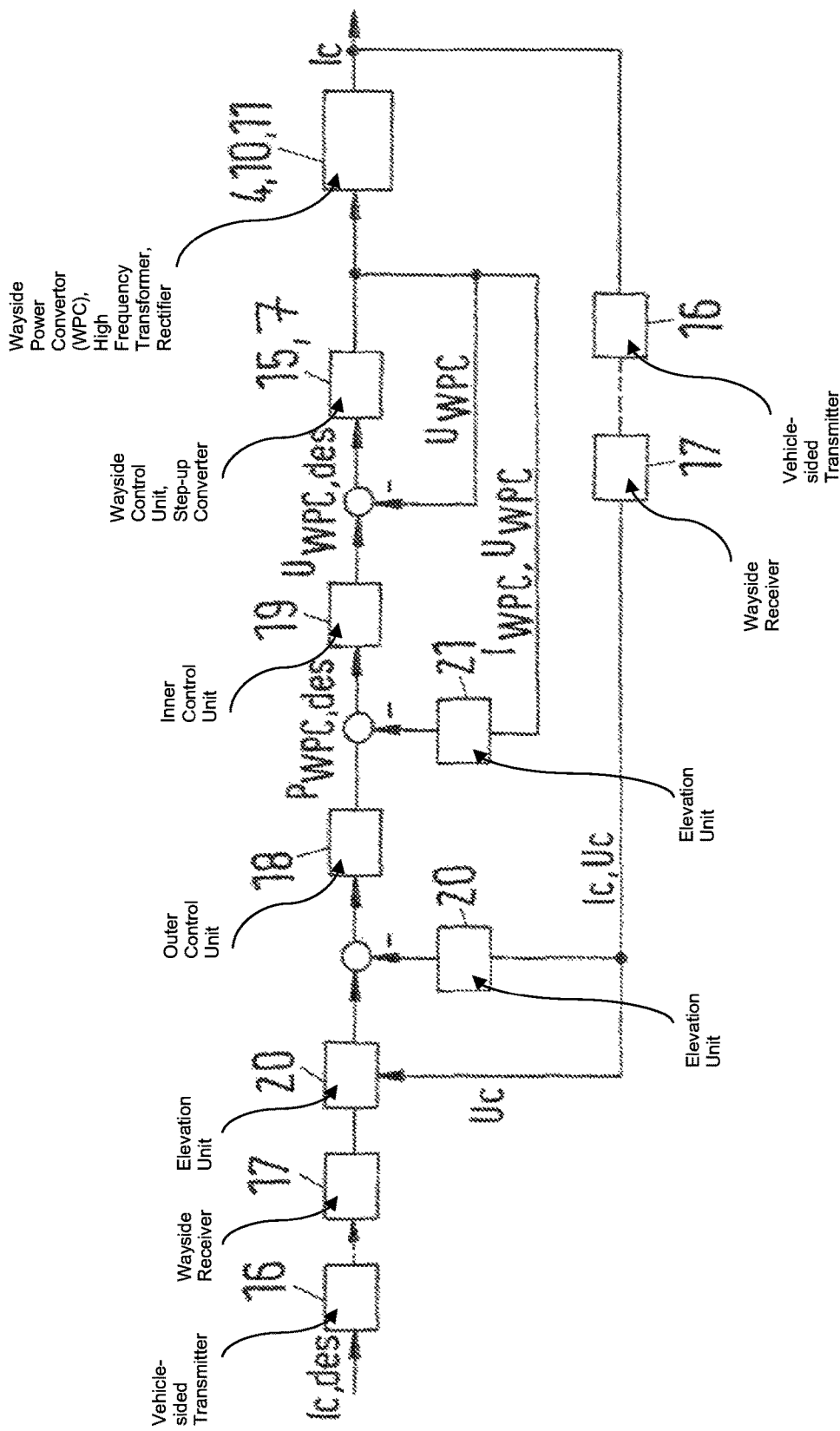

In FIG. 6, another control schema is illustrated. Again, a desired transfer current $I_{C,des}$ is determined, e.g. by a vehicle-sided energy storage element management system.

The desired transfer current $I_{C,des}$ is transmitted via a vehicle-sided transmitter 16 to a way-sided receiver 17, in particular via a unidirectional communication. Further transmitted is an actual transfer current $I_C$ and an actual input voltage $U_C$ which can e.g. be measured by corresponding sensing devices, e.g. a current sensor and a voltage sensor (not shown). Using the desired transfer current $I_{C,des}$, the actual transfer current $I_C$ and the actual input voltage $U_C$, an evaluation unit 20 can determine a desired input power of the energy storage element 12 e.g. by the product of desired transfer current $I_{C,des}$ and the actual input voltage $U_C$. Further, an actual input power, e.g. the product of the actual input voltage $U_C$ and the actual transfer current $I_C$, can be determined, e.g. also by the evaluation unit 20. The deviation between the desired and the actual input power of the energy storage element 12 provides an input for a first, outer control unit 18 which is arranged on the wayside. The first outer control unit 18 determines a desired input power $P_{WPC,des}$ of the WPC 4. An actual input power of the WPC 4 can be determined, e.g. as the product of an actual input current $I_{WPC}$ and an actual input voltage $U_{WPC}$ of the WPC 4, e.g. by another evaluation unit 21. The deviation between the desired input power $P_{WPC,des}$ and the actual input power of the WPC 4 provides an input for a second, inner control unit 19. The second, inner control unit 19 determines a desired input voltage $U_{WPC,des}$ of the WPC 4 depending on said deviation. Said input voltage $U_{WPC,des}$ provides a set point for the control unit 15 which controls the operating of the step-up converter 7.

Further is shown that an actual input voltage $U_{WPC}$ of the WPC 4 and an actual input current $I_{WPC}$ of the WPC 4 can be fed back to the second inner control unit 19 and the control unit 15.

The invention claimed is:

1. A method of operating an inductive power transfer system for transferring power, wherein the inductive power transfer system comprises a primary winding structure for generating an alternating electromagnetic field and a secondary winding structure for receiving the alternating electromagnetic field and generating an alternating current output voltage, wherein the alternating current output voltage is rectified and supplied to at least one energy storage element, wherein the rectified output voltage is adjusted by varying a gap size of a gap between the primary winding structure and the secondary winding structure,
   wherein the gap size is adjusted to prepare an energy transfer process or to initiate an energy transfer process or to control an energy transfer process depending on charging characteristics of the at least one energy storage element,
   wherein the gap size is adjusted such that a first rectified output voltage is provided, wherein the gap size is held constant as long as the first rectified output voltage is providable by adjusting an input voltage of a wayside power converter, wherein the input voltage of the wayside power converter is adjustable between given voltage limits.

2. The method according to claim 1, wherein the rectified output voltage or the rectified output current is additionally adjusted by adjusting a least one field characteristic of the power transfer system.

3. The method according to claim 1, wherein the rectified output voltage or the rectified output current is additionally adjusted by adjusting the input voltage of the wayside power converter.

4. The method according to claim 1, wherein the gap size is adjusted such that a minimal input voltage of the wayside power converter is transformed into the first rectified output voltage or such that a difference between the first rectified output voltage and the rectified output voltage due to the minimal input voltage of the wayside power converter is smaller than a predetermined threshold value.

5. The method according to claim 1, wherein the gap size is adjusted if the input voltage of the wayside power converter reaches a predetermined voltage limit.

6. The method according to claim 1, wherein the gap size is adjusted such that the rectified output voltage is equal to an actual total storage element voltage of the at least one energy storage element.

7. The method according to claim 1, wherein the gap size is varied continuously or gradually.

8. The method according to claim 1, wherein the input voltage of the wayside power converter is provided by a step-up converter or a step-down converter or a combination thereof.

9. The method according to claim 1, wherein the gap size is varied by a secondary side positioning means or by a primary side positioning means.

10. The method according to claim 1, wherein the input voltage of the wayside power converter is controlled depending on a deviation between a first transfer current and an actual transfer current.

11. The method according to claim 1, wherein a deviation between a first input power of the wayside power converter and an actual input power of the wayside power converter is determined, wherein the first input power of the wayside power converter is determined depending on the deviation between a first input power of the energy storage element and the actual input power of the energy storage element, wherein a first input current of the wayside power converter is determined depending on a deviation between the first input power and the actual input power of the wayside power converter, wherein the input voltage of the wayside power converter is controlled depending on the first input current of the wayside power converter.

12. The method according to claim 11, wherein an actual transfer current, a first transfer current and an actual input voltage are transmitted from the secondary side to the primary side via a unidirectional communication.

13. An inductive power transfer system for transferring energy to a vehicle, wherein the inductive power transfer system comprises a primary winding structure for generating an alternating electromagnetic field and a secondary winding structure for receiving the alternating electromagnetic field and generating an alternating current output voltage, wherein the alternating current output voltage is rectifiable and supplyable to at least one energy storage element, wherein the inductive power transfer system comprises at least one means for adjusting a gap size of a gap between the primary winding structure and the secondary winding structure, wherein the rectified output voltage is adjustable by varying the gap size, wherein the gap size is adjustable to prepare or to initiate or to control an energy transfer process depending on charging characteristics of the at least one energy storage element,
   wherein the gap size is adjustable such that a first rectified output voltage is provided, wherein the gap size is held constant as long as the first rectified output voltage is providable by adjusting an input voltage of a wayside power converter, wherein the input voltage of the wayside power converter is adjustable between given voltage limits.

14. The inductive power transfer system according to claim 13, wherein the inductive power transfer system comprises at least one input voltage generating means for providing an adjustable input voltage of the wayside power converter, wherein the wayside power converter is connected to a voltage supply means via the at least one input voltage generating means.

15. The inductive power transfer system according to claim 14, wherein the at least one input voltage generating means is provided by a step-up converter or a step-down converter or a combination thereof.

16. The inductive power transfer system according to claim 13, wherein the at least one means for adjusting the gap size of a gap between the primary winding structure and the secondary winding structure is/are provided by a secondary side positioning means or a primary side positioning means.

17. The inductive power transfer system according to claim 13, wherein the inductive power transfer system comprises at least one means for a unidirectional communication between the secondary side and the primary side.

* * * * *